United States Patent

[11] 3,564,137

[72] Inventors Ernest C. MacIntyre, Jr.
Villa Park, Ill.;
William H. Slavik, Oak Lawn, Ill.

[21] Appl. No. 700,912
[22] Filed Jan. 26, 1968
[45] Patented Feb. 16, 1971
[73] Assignee Motorola, Inc.
Franklin Park, Ill.

[54] AUTOMATIC BRIGHTNESS COMPENSATION CIRCUIT
4 Claims, 1 Drawing Fig.

[52] U.S. Cl. .......... 178/7.5, 178/5.4
[51] Int. Cl. .......... H04n 5/16
[50] Field of Search .......... 178/5.4, 5.4 (ACC), 7.3 (E,DC), 7.5 (E,DC), 5.4 (DEN), 5.4 (RW), (Inquired); 315/30; 330/22, 40, 128, 127, 130, 131, 129, 139

[56] References Cited

UNITED STATES PATENTS

| | | | |
|---|---|---|---|
| 2,620,406 | 12/1952 | Nelson .......... | 330/128 |
| 2,800,528 | 7/1957 | Beste .......... | 315/30 |
| 3,465,095 | 9/1969 | Hansen et al. .......... | 178/5.4 |

*Primary Examiner*—Richard Murray
*Assistant Examiner*—John C. Martin
*Attorney*—Mueller, Aichele and Rauner

ABSTRACT: A video signal amplifier is direct current coupled to a cathode ray tube, and an amplifier device, which is sensitive to variations in supply voltage and environmental temperature, is coupled to the video amplifier to compensate conduction changes therein and maintain the brightness level of the image despite these variations. The compensation circuit may be part of a system limiting maximum brightness level of the image.

PATENTED FEB 16 1971 3,564,137
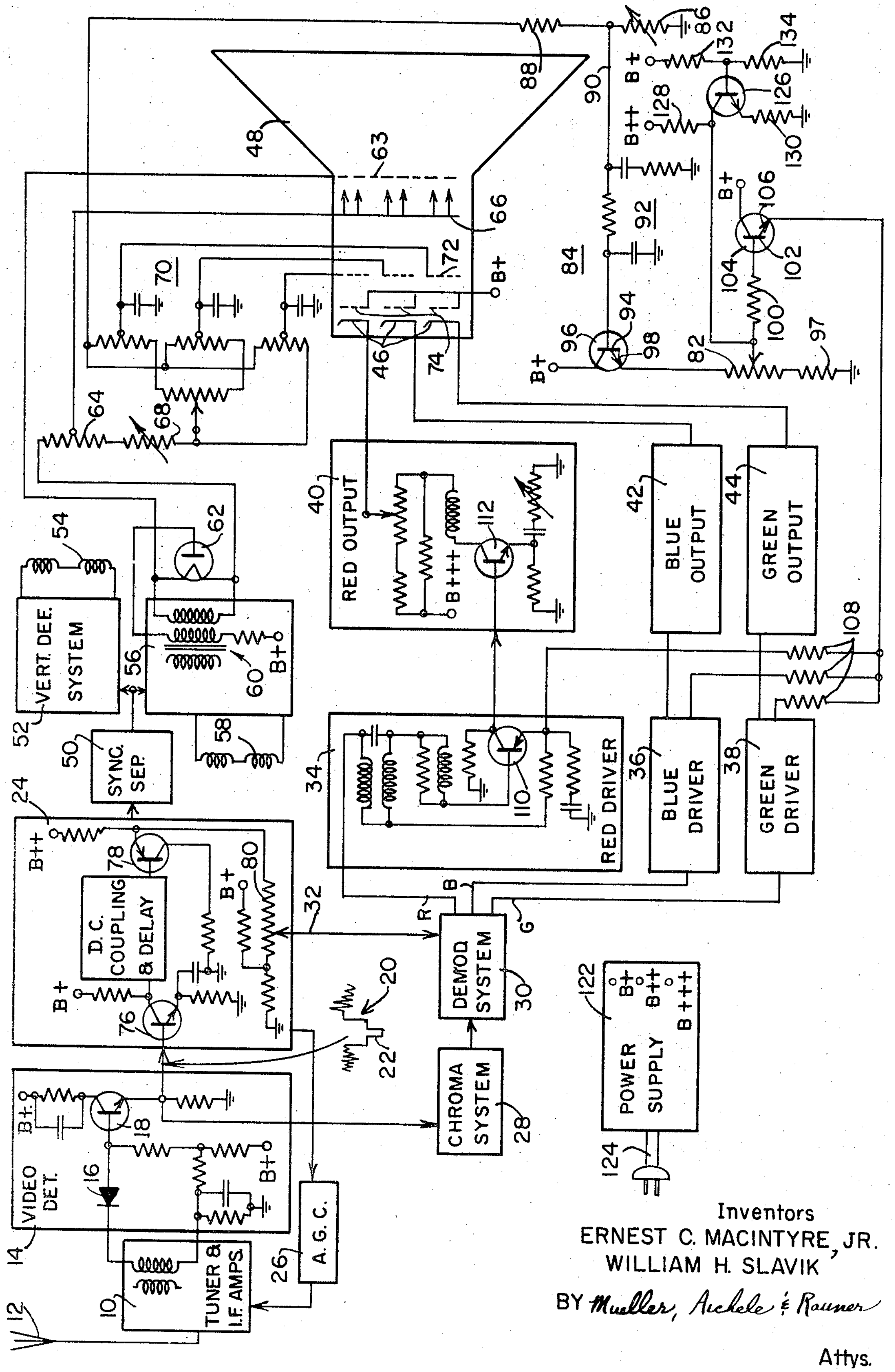
Inventors
ERNEST C. MACINTYRE, JR.
WILLIAM H. SLAVIK
BY Mueller, Aichele & Rauner
Attys.

AUTOMATIC BRIGHTNESS COMPENSATION CIRCUIT

BACKGROUND

While transistor devices are now being widely used in television receivers, it is sometimes found that these devices respond to variation in B+ power supply voltage (developed from line voltage) or variation in temperature to cause a deterioration in performance of the equipment in which they are used. These effects may be quite detrimental in a television receiver where undesired conduction changes can result in a change in image brightness level, especially with a high percentage of direct current coupling between the transistors and the cathode-ray picture tube.

In color television receivers, the saturation and hue of the colors may be noticeably affected by deviations from a constant black level in the picture. Thus it has been proposed to provide maximum direct current coupling between the demodulator circuitry and the tube for maximum fidelity of the color image. However with certain picture content and/or certain brightness and contrast levels, the average direct current component of the video signal applied to the cathode-ray tube is of sufficient amplitude to increase the beam intensity beyond a safe value. The increase may significantly reduce the high voltage to the cathode-ray tube, deteriorate picture focus, destroy resolution and subject parts of the receiver to possible high voltage damage. It is desirable to eliminate these adverse affects but since picture highlights are conveyed by the instantaneous beam intensity, only the average beam intensity of brightness should be affected. Accordingly, in a transistorized television receiver, especially one with the desirable direct current coupling of the video signal to the picture tube, the brightness level of the image should not only be limited but in addition should be compensated for undesired conduction changes of the video amplifier transistors.

SUMMARY

It is an object of this invention to compensate video amplifier transistors in a television receiver, especially in a system with a high percentage of direct current coupling to the cathode-ray picture tube.

A further object is to reduce brightness level variations in the television image which are caused by voltage and/or temperature variations, and to do so with a circuit offering particular advantage when used as a part of a brightness limiting circuit for the reproduced image.

In a specific form according to the invention, a television receiver includes a transistorized video amplifier system direct current coupled to a cathode-ray tube for translating the video signal thereto. The transistors of the amplifier are biased by an operating direct current potential, but such bias is subject to variation in a given direction in response to changes in power supply voltage, for example due to changes in power line supply voltage. Such a bias variation is reflected as a change in average direct current component at the cathode-ray tube thus producing a brightness change of the image. Similarly a change can occur due to video amplifier conduction variation in response to temperature changes of the receiver. A transistor amplifier device in a stabilization circuit is coupled to the video amplifier and energized by the same power supply, and subject to the same temperature variations, for varying the video amplifier bias in a direction to compensate for the given variation due to power supply or temperature changes.

Since the video signal is direct current coupled, it is highly desirable to incorporate a beam current limiter system for setting the maximum brightness level of the image. The stabilization circuit is advantageously a part of this beam limiter system so that the stabilization or compensation signal is also applied through the limiter control path.

BRIEF DESCRIPTION OF THE DRAWING

The drawing illustrates a color television receiver partially in block and partially in schematic incorporating the system of the invention.

DETAILED DESCRIPTION OF THE PREFERRED EMBODIMENT

The color television receiver shown in the drawing includes circuitry 10 which converts a received color television signal at antenna 12 into an intermediate frequency signal. The intermediate frequency signal is applied to a video detector 14 which includes a detector diode 16 and an emitter follower transistor 18 to furnish a composite demodulated video signal 20 having horizontal synchronizing pulses 22 and vertical synchronizing pulses (not shown) and luminance and chrominance components. The video signal 20 is amplified by video amplifier system 24 and coupled to an automatic gain control circuit 26 which develops a signal indicative of the amplitude of the video signal to control the gain of amplifier devices in circuitry 10.

The composite video signal 20 is applied to chroma system 28 which filters and amplifies the chrominance components and applies the same to the demodulator system 30. The luminance components of the video signal on conductor 32 are DC coupled from the video amplifier system 20 to the demodulator system 30 wherein the chrominance components are demodulated with the luminance components to provide separate red, blue and green representative signals to be amplified by the respective driver circuits 34, 36 and 38. After further amplification by respective ones of the output amplifiers 40, 42 and 44, the representative signals are applied to the cathodes 46 of a trigun cathode-ray tube 48 to individually drive the electron guns thereof in accordance with known operation for production of a composite image in color.

The signal from video amplifier system 20 is applied to sync separator circuit 50 which separates the vertical synchronizing pulses from the video signal 20. The separated pulses are used in a vertical deflection system 52 for generating a sawtooth current through the deflection winding 54 disposed on the neck of the cathode-ray tube 48. The horizontal synchronizing pulses 22 in the composite video signal 20 are separated in sync separator circuit 50 and are applied to a horizontal deflection system 56 which develops a sawtooth signal in deflection winding 58. Pulses developed across a transformer 60 in the system 56 are rectified in rectifier 62 to provide high voltage, on the order of 27 kv., for the final anode 63 of cathode-ray tube 48. A high value voltage divider 64 has a tap connected to the focus electrode 66 of cathode-ray tube 48. In series with divider 64 is a potentiometer 68 to permit adjustment of picture focus. A plurality of controls 70 are provided to independently adjust the voltage on the screen electrode 72 to compensate for differences in the characteristics of the three electron guns. The control grid electrodes 74 are coupled to a fixed B+ voltage.

The peaks of the synchronizing pulses including horizontal pulses 20 are established at a fixed level commonly referred to as the black level and is independent of picture content. To produce an accurate color image, the black level should be retained all the way to the cathode-ray tube 48 by 100 percent DC coupling. To this end, the video signal 20 is amplified by a video amplifier transistor 76, delayed, and DC coupled to a further video amplifier transistor 78. The movable arm of a contrast control potentiometer 80 at the emitter of transistor 78 is 100 percent DC coupled through the demodulator system 30, through the driver circuits 34—38, the output amplifiers 40—44 to the cathodes 46 of the cathode-ray tube 48.

The average intensity of the electron beams in the cathode-ray tube 48 is controlled by its bias and since the voltage on the control grid electrodes 74 is fixed, the voltage on the cathodes 46 controls the average beam intensity. Because the video signal 20 is direct current coupled to the cathode-ray tube, as its average direct current component increases, (i.e., the background of the televised picture becomes brighter), the average voltage on the cathodes 46 decreases to increase the average beam intensity. Also the average voltage on the cathodes 46 may be varied by a viewer accessible potentiometer 82 to be subsequently explained. If the average beam intensity exceeds a predetermined value, a number of undesirable effects occur such as reduction in the high voltage for the cathode-ray tube 48, defocusing of the image and possible damage to components in the horizontal deflection system 56.

Protection against the average beam intensity exceeding such predetermined level is provided by automatic beam limiter system 84 which includes sensing means comprising potentiometer 86, resistor 88, potentiometer 64 and the controls 70. As the beam intensity increases, the high voltage applied to the inner conductive coating of cathode-ray tube 48 decreases to provide a control voltage indicative of beam intensity on conductor 90. The control voltage is applied through phase equalizer, arc protector and video filter 92 to the base 94 of an emitter follower NPN transistor 96. The emitter 98 is coupled through the brightness control potentiometer 82 and a resistor 97 to ground. The movable arm of potentiometer 82 is coupled through an arc protection resistor 100 to the base 102 of a second emitter follower NPN transistor 104, the emitter 106 of transistor 104 is coupled through three resistors 108 to respective ones of the emitters of the drive circuits 34, 36 and 38. The collectors of transistors 96 and 104 are coupled to B+.

The potentiometer 86 provides a threshold setting for the system 84 and is adjusted so that when the average beam intensity is less than the predetermined level, the control voltage on conductor 90 is of sufficient magnitude to saturate transistor 96 which in turn saturates transistor 104 to provide a voltage approximately equal to B+. The voltage is coupled through each of the resistors 108 to, for example, the emitter of PNP transistor 110 of driver amplifier 104 to provide the bias voltage therefor. Since the base of NPN transistor 112 in red output amplifier 40 is DC coupled to transistor 110, and since the bias voltage is constant, the black level of the video signal at the cathode-ray tube 38 is fixed at the level determined by potentiometer 82 and the average direct current component at the cathode-ray tube is permitted to vary freely with the video content.

If the average beam intensity exceeds the predetermined level, the high voltage from system 56 decreases to the point where the control voltage on conductor 90 is no longer sufficient to saturate transistor 96. The voltage on emitter 98 decreases as does the voltage on emitter 106 to decrease the bias voltage on the emitter of transistor 110. The resulting increase in the quiescent voltage on the collector of transistor 112 serves to raise the average voltage on the cathodes 46 of cathode-ray tube 48 to decrease the average beam intensity back to the predetermined level. Voltage drop through resistors 108 is proportional to the amount that the average beam intensity tends to exceed the predetermined level to thereby maintain the average voltage on cathodes 46 constant so that the average beam intensity is constant at the predetermined level.

Another way of viewing the operation just explained is to observe the B+ voltage is coupled through the collector-emitter of transistor 104 through resistor 108 to the emitter of transistor 110 in red driver stage 34 to control bias therefor. The control voltage appearing on the base 102 of transistor 104 controls the value of this collector-emitter resistance so that when the control voltage on conductor 90 decreases to decrease the bias on transistor 104, such collector-emitter resistance increases and the bias voltage on the emitter of transistor 110 decreases. Further along these lines, the base-emitter junction of transistor 112 is coupled in series with the collector and emitter of transistor 110 and the collector and emitter of transistor 104. Thus, a decrease in the control voltage on conductor 90 which causes a decrease in the bias on transistor 104, reduces the bias current in transistor 112 to reduce its conduction and increase the voltage on the cathode 46 of cathode-ray tube 48.

The receiver includes a power supply 122 which converts an AC line voltage appearing on leads 124 into DC potentials of various magnitudes for different ones of the receiver circuits. A drop in line voltage, as is known to periodically occur, will be reflected as a decrease in the B+ voltage on the collector of transistor 104 which for a given control voltage on conductor 90 will result in a decrease in the bias on transistors 110 and 112. This increases the voltage on the cathodes 46 of cathode-ray tube 48 to decrease the average beam intensity. It is, of course, undesirable to permit the intensity to vary with the line voltage.

Such variations are reduced by utilizing a transistor 126 having its collector coupled through a resistor 128 to the B++ potential and its emitter coupled through a resistor 130 to ground reference potential. The bias for transistor 126 is established by a voltage divider comprising resistors 132 and 134 coupled from the DC potential to ground. The collector of transistor 126 is coupled to the arm of the potentiometer 82. If the B+ potential from power supply 122 decreases, to decrease the bias on transistors 110 and 112, there is a corresponding reduction in the bias on the compensating resistor 126. This latter bias reduction increases the voltage on the collector of transistor 126 to provide an increased positive voltage on emitter 106 to increase the bias on transistors 110 and 112 to reduce the average voltage on the cathodes 46 of cathode-ray tube 48 and thereby compensate for the brightness decrease arising from the drop in DC potential. Of course, if the DC potential increases, the compensating transistor 126 operates in the reverse direction to compensate the resulting decrease in voltage on the cathodes 46 of cathode-ray tube 48. It should be noted that the B+ potential is also coupled through the collector-emitter resistance of transistor 96 in system 84 so that a change in such potential is also reflected as a change in the bias on transistor 104. However, the collector of compensating transistor 126 is coupled to the bias point for the transistor 104 so that in addition to compensating transistors 110 and 112 as just explained, it also compensates for the bias change on transistor 104. A given error at the beginning at the DC amplifier string, i.e., such as the base 102 of transistor 104, will be amplified by each of the transistors in the string, namely transistors 104, 110 and 112. But, an advantage of the circuit just described is that the compensating voltage is similarly amplified to provide more complete compensation for each transistor. It should also be noted that a closed direct current loop is defined by the transistors 96, 104, 110, 112, the cathode-ray tube 48, the voltage divider 64, the controls 70 and the resistor 86 back to the transistor 96. Thus it can be seen that the compensation provided by transistor 126 also aids in compensating transistor 96. More broadly therefore, the compensating transistor 126 may be inserted at any point in the closed loop in which case it will compensate, at least to some degree, all of the transistors in the loop. Since all of the transistors just described are required to amplify the DC voltage, with transistors 110, 112 to amplify the average direct current components of the video signal and with transistors 96 and 104 to amplify the DC control voltage on conductor 90, it is important that transistor 126 have an open loop configuration. This is accomplished by connecting the base-emitter junction of transistor 126 across the B+ reference potential from power supply 122. A change in the control voltage on conductor 90 or a change in the average direct current component will not affect the bias on transistor 126 so that the transistor will not cancel out such changes. Further advantages of using a transistor for compensation is to provide power gain in the case shown and phase inversion of the reference potential (i.e., an increase in the DC potential causes a decrease in the correction potential on the collector of transistor 126). Depending on the loop gain involved and the particular electrode and conductivity of the transistor to which the compensating transistor 126 is to be connected, current gain may be utilized as provided by a connection to the emitter rather than the collector.

A still further advantage of this circuit as described arises from the temperature response characteristic of a transistor. Since the transistor 126 is in the same cabinet with the transistors 96, 104, 110, 112, etc., it will be subjected to the same temperature changes. Thus, if the ambient temperature increases, the conduction of transistor 110 in red output stage 40 will increase to reduce the DC voltage on the cathodes 46 of the cathode-ray tube 48. It is, of course, desirable that the effect on the average beam intensity due to temperature variations be minimized. The bias on the compensating transistor 126 will correspondingly increase with a temperature increase to reduce the voltage on its collector. This reduces the bias on transistor 104 and decreases the bias for transistors 110 and 112 to increase the average voltage on the cathodes 46 and thereby compensate for effects arising from temperature variations.

What has been described, therefore, is an improved automatic beam limiter system which includes a circuit to maintain the average beam intensity and, therefore, the average brightness relatively constant over a range of line voltage and temperature variations.

We claim:

1. In a television receiver including a transistorized video amplifier system direct current coupled to a cathode-ray tube for translating a video signal thereto, said video amplifier system including transistors subject to changes in conduction in response to conditions or of receiver operation in addition to video signal changes thereby varying the brightness of the cathode-ray tube image, a said receiver also including a brightness limiting circuit coupled with the high voltage system of the television receiver for producing a control voltage indicative of the total average beam current, the control voltage being coupled with the video amplifier system for controlling the operation thereof to maintain the total average beam current in the cathode-ray tube constant at a predetermined brightness level, and said receiver further including a power supply to provide a direct current potential subject to undesired variation, an automatic compensation system including in combination:

a semiconductor amplifier device;

bias circuit means coupled to said amplifier device and energized by said power supply and responsive to charges in voltage of the power supply to develop an output signal from a said amplifier device; and means direct current coupling said semiconductor amplifier device to said transistorized video amplifier system through at least in part a portion of said brightness limiting circuit for applying said output signal to said transistorized video amplifier system with a polarity and amplitude to compensate the change conduction of said video amplifier system and maintain said predetermined brightness level in the cathode-ray tube.

2. The compensation system of claim 1 in which said semiconductor amplifier device is positioned to be subjected to substantially in the same temperature variations as the video amplifier system in the television receiver, and said semiconductor device has a temperature response characteristic to produce a change in the output signal thereof to compensate changed conduction in said amplifier system due to temperature variation.

3. The television receiver of claim 1 in which said video amplifier system includes a transistor having an emitter electrode and the brightness limiting circuit includes a further transistor coupled between said emitter electrode and the receiver power supply, said further transistor having a base electrode with a brightness control potentiometer connected thereto, and said further transistor forming at least part of the means direct current coupling said semiconductor amplifier device to said video amplifier system.

4. In a television receiver including a transistorized video amplifier system direct current coupled to input electrode means by a cathode-ray tube, said cathode-ray tube having a final anode and high voltage supply means for energizing the same, said video amplifier system including a transistor subject to changed conduction in response to power supply voltage variation in said receiver, an automatic beam control system for regulating brightness of the image in said cathode-ray tube, including in combination: limiter circuit means comprising a first transistor amplifier device direct current coupled between said high voltage supply means and said video amplifier system for controlling the voltage applied to said video amplifier system and including a video signal filter means, responsive only to average changes in said high voltage supply resulting in image brightness changes, coupled to said first transistor amplifier device to control the conductivity thereof to adjust the voltage in said video amplifier system applied to said cathode-ray tube for maintaining image brightness below a given level, said brightness limiting circuit including an adjustable control for selecting said brightness control level; and second transistor amplifier device direct current coupled to said brightness control circuit and energized by the receiver power supply circuit to be responsive to voltage changes thereof, said second transistor amplifier device having gain and polarity to develop a signal in said brightness limiting circuit for applying a voltage to said video amplifier system to compensate for conduction changes therein due to variations in the voltage from the receiver power supply.